United States Patent Office 3,136,792
Patented June 9, 1964

3,136,792
6-CHLORO PREGNENES AND PROCESS FOR PRODUCING SAME
Frank A. Cutler, Jr., Westfield, N.J., assignor to Merck & Co., Inc., Rahway, N.J., a corporation of New Jersey
No Drawing. Filed Nov. 20, 1959, Ser. No. 854,249
7 Claims. (Cl. 260—397.47)

This application is a continuation in part of U.S. patent applications Serial No. 805,712, filed April 13, 1959, now abandoned, and Serial No. 805,655, filed April 13, 1959, now abandoned.

The present invention relates generally to new steroid compounds and to a method for producing them. More particularly it relates to new 6-chloro steroids and to a process for producing them from the corresponding 5,6-dichloro steroids.

The compounds which are included within the scope of my invention are presented by the following general structural formula:

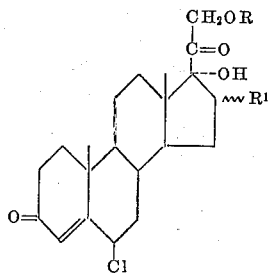

wherein R is hydrogen or an acyl radical and $R^1$ is hydrogen or a methyl radical.

In the foregoing structural formula, R can represent hydrogen or an acyl radical derived from an aromatic carboxylic acid such as a benzoyl radical or from an aliphatic carboxylic acid such as a formyl, acetyl, propionyl, butyryl, valeryl, t-butyl acetyl, caproyl and capryl radical.

The process of my invention comprises treating a 5,6-dichloro compound of the formula:

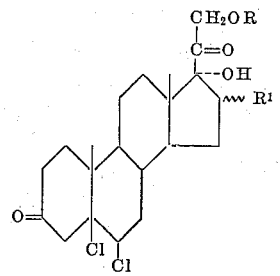

wherein R is hydrogen or an acyl radical and $R^1$ is hydrogen or a methyl radical with a mild base such as an alkali metal salt of an aliphatic carboxylic acid in a solvent for the steroid, to produce a 6-chloro-21 acyloxy or hydroxy - $17\alpha$ - hydroxy-4-pregnene-3,20-dione compound, e.g. 6-chloro-17α-hydroxy-21-acetoxy-4-pregnene-3,20 - dione, and 6-chloro-17α-hydroxy-21-acetoxy - 16α-methyl-4-pregnene-3,20-dione or 6 - chloro-17α-hydroxy-21 - acetoxy-16β-methyl-4-pregnene - 3,20 - dione. These 5,6-dichloro-21-acyloxy - 17α - hydroxy-pregnane-3,20-dione compounds are disclosed in U.S. Patent 2,786,856 to Cutler and Chemerda. The 21-acyloxy compounds are conveniently hydrolyzed to the corresponding 6 - chloro-17α, 21-dihydroxy-4-pregnene-3,20-dione by treatment with a mixture of about 1 part of concentrated hydrochloric acid and 4 parts of methanol at about 25° C. for one hour.

Suitable starting materials which are used in the process of my invention are 5,6-dichloro-21-acyloxy or hydroxy-17α-hydroxy-pregnane-3,20-dione compounds such as 5,6-dichloro-17α,21-dihydroxy-pregnane - 3,20 - dione, 5,6 - dichloro - 21 - benzoyloxy-17α-hydroxy-pregnane-3,20-dione, 5,6 - dichloro - 21 - acetoxy - 17α - hydroxy-pregnane-3,20-dione, 5,6 - dichloro - 21 - propionyloxy-17α - hydroxy-pregnane-3,20-dione, 5,6 - dichloro-21-butyryloxy-17α-hydroxy-prengane-3,20-dione, 5,6 - dichloro-21 - tertiary butyl acetoxy-17α-hydroxy-pregnane-3,20-dione, and 5,6 - dichloro-21-caproyloxy-17α-hydroxy-pregnane-3,20-dione, as well as 5,6-dichloro-21-acyloxy- or hydroxy-17α-hydroxy-16-methyl - pregnane - 3,20 - dione compounds such as 5,6-dichloro-17α,21-dihydroxy-16α-methyl-pregnane-3,20-dione, 5,6 - dichloro-21-benzoyloxy-17α-hydroxy-16α-methyl - pregnane - 3,20 - dione, 5,6-dichloro-21-acetoxy-17α-hydroxy - 16α - methyl - pregnane-3,20 - dione, 5,6 - dichloro-21-propionyloxy-17α-hydroxy-16α-methyl-pregnane-3,20-dione, 5,6 - dichloro - 21 - butyryloxy-17α-hydroxy-16α-methyl-pregnane - 3,20 - dione, 5,6 - dichloro-21-tertiary butyl acetoxy-17α-hydroxy-16α-methyl-pregnane-3,20-dione, 5,6-dichloro-21-caproyloxy-17α - hydroxy-16α-methyl-pregnane-3,20-dione 5,6 - dichloro-17α,21-dihydroxy-16β-methyl-pregnane-3,20-dione, 5,6-dichloro - 21 - benzoyloxy-17α-hydroxy-16β-methyl-pregnane-3,20-dione, 5,6-dichloro - 21 - acetoxy-17α-hydroxy-16β-methyl-pregnane-3,20-dione, 5,6 - dichloro-21-propionyloxy-17α-hydroxy-16β-methyl - pregnane - 3,20-dione, 5,6 - dichloro-21-butyryloxy - 17α - hydroxy - 16β-methyl-pregnane-3,20-dione, 5,6 - dichloro - 21 - tertiary butyl acetoxy - 17α - hydroxy - 16β - methyl - pregnane-3,20-dione, and 5,6 - dichloro - 21 - caproyloxy - 17α-hydroxy-16β-methyl-pregnane-3,20-dione. The preparation of these 16α-methyl starting materials is described in greater detail in Example 6 of the application.

The selected 5,6-dichloro steroid starting material is intimately mixed in an aqueous organic solvent with an excess of an alkali metal salt of a lower aliphatic carboxylic acid, e.g. sodium acetate, sodium propionate, sodium butyrate, sodium formate, potassium acetate, potassium propionate and potassium butyrate. The resulting reaction mixture is then stirred for a suitable length of time, the time depending on the temperature at which the reaction is conducted to produce the corresponding 6-chloro-21-acyloxy or hydroxy-17α-hydroxy-4-pregnene-3,20-dione or the corresponding 6-chloro-21-acyloxy or hydroxy-17α-hydroxy-16α-methyl-4-pregnene - 3,20-dione compound of my invention.

The solvent selected is preferably one which is at least partially miscible with water and which will dissolve both the steroid starting compound and the alkali metal salt reactant employed. Suitable solvents are lower aliphatic alcohols such as methanol, ethanol, N-propyl alcohol, isopropyl alcohol, n-butanol, isobutyl alcohol and t-butyl alcohol; lower aliphatic ketones such as acetone, diethyl ketone, methyl ethyl ketone, and methyl propyl ketone as well as lower aliphatic ethers and lower esters of aliphatic carboxylic acids.

As previously mentioned the time and temperature for carrying out the reaction are interdependent. Thus, the temperature at which the reaction can be carried out varies between about 40° C. and about 100° C. and the time employed for carrying out the reaction may vary from a few minutes to a number of hours.

In a preferred embodiment of my invention, one part of 5α,6β-dichloro-21-acetoxy-17α-hydroxy-pregnane-3,20-dione is mixed with one part of sodium acetate and 50 parts of 95% ethanol and the resulting mixture heated at the reflux temperature for approximately 30 minutes to produce 6β-chloro-21-acetoxy-17α-hydroxy-4-pregnene-3,20-dione. The formed product is then conveniently recovered by removal of the ethanol by evaporation under reduced pressure and precipitation of the product by the addition of additional water. The precipitated product may then be filtered and dried.

The products formed by the process of my invention are new steroid compounds which are useful as intermediates in the preparation of valuable steroid anti-inflammatory agents. Thus, 6β-chloro-21-acetoxy-17α-hydroxy-4-pregnene-3,20-dione is readily converted to 21-acetoxy-17α-hydroxy-4-pregnene-3,20-dione by treatment with chromous chloride. This substance is converted by known microbiological oxidation techniques to the valuable anti-inflammatory steroid, hydrocortisone, according to processes described in U.S. Patent 2,658,023 of Shull et al.

The 6-chloro-17α-hydroxy-21-acyloxy or hydroxy-16-methyl-4-pregnene-3,20-dione compounds are converted by treatment with chromous chloride to 17α-hydroxy-21-acyloxy or hydroxy-16-methyl-4-pregnene-3,20-dione compounds, which in turn are converted by introduction of a hydroxyl group at the 11-position to 11β,17α-dihydroxy-21-acyloxy or hydroxy-16-methyl-4-pregnene-3,20-dione compounds which possess extremely high anti-inflammatory activity. The hydroxyl group at the 11-position is introduced by contacting the 17α-hydroxy-21-acyloxy or hydroxy-16-methyl-4-pregnene-3,20-dione compounds with a growing culture of an oxygenating strain of *Curvularia lunata* N.R.R.L. No. 2434 and recovering the resulting oxygenated product from the fermentation broth by conventional means such as are described in U.S. Patent 2,658,923 of Shull et al.

The compounds of my invention are also useful as intermediates in the preparation of valuable 6-chloro-11β,17α-21-trihydroxy-4-pregnene-3,20-dione compounds, as for example 6-chloro-hydrocortisone and 6-chloro-16α-methyl-hydrocortisone. To prepare these valuable anti-inflammatory steroids from the compounds of my invention one may employ the procedures described in U.S. Patent 2,658,023 of Shull et al. Thus, for example, 6-chloro-17α,21-dihydroxy-4-pregnene-3,20-dione or the corresponding 6-chloro-16α-methyl-17α,21-dihydroxy-4-pregnene-3,20-dione may be contacted with a growing culture of a oxygenating strain of *Curvularia lunata* N.R.R.L. No. 2434 and recovering respectively the resulting 6-chloro-hydrocortisone and the 6-chloro-16α-methyl-hydrocortisone from the fermentation broth by conventional methods such as are described in the above identified U.S. patent of Shull et al.

The following examples are intended to be illustrative in nature and should not be construed as limiting the invention to the specific embodiments described.

EXAMPLE 1

*6β-Chloro-21-Acetoxy-17α-Hydroxy-4-Pregnene-3,20-Dione*

A mixture of one gram of 5α,6β-dichloro-21-acetoxy-17α-hydroxy-pregnane-3,20-dione, prepared as described in U.S. Patent 2,786,856, 1 gram of anhydrous sodium acetate and 50 ml. of 95% ethanol is maintained at the reflux temperature of the reaction mixture for approximately 30 minutes to produce 6β-chloro-21-acetoxy-17α-hydroxy-4-pregnene-3,20-dione. To the resulting colorless solution containing the product is added approximately 50 ml. of water and the entire reaction mixture is then evaporated under reduced pressure to remove the ethanol, whereupon an aqueous slurry of crystalline product is formed. An additional 50 ml. of water is added and the slurry is cooled and filtered to recover the product. The product is then washed and dried; melting point 176–178° C., dec.;

$\lambda_{max.}^{methanol}$ 2400 A°, log E 4.11.

In the manner described in the preceding paragraph 5α,6β-dichloro-17α,21-dihydroxy-pregnane-3,20-dione is treated with potassium acetate in ethanol to produce 6β-chloro-17α,21-dihydroxy-4-pregnene-3,20-dione which is recovered by precipitation with water, filtered and dried.

EXAMPLE 2

*Other 21-Esters of 6-Chloro-17α,21-Dihydroxy-4-Pregnene-3,20-Dione*

In the manner described in Example 1 and using as the steroid starting material 5α,6β-dichloro-21-propionyloxy-17α-hydroxy-pregnane-3,20-dione, 5α,6β-dichloro-21-butyryloxy-17α-hydroxy-pregnane-3,20-dione, 5α,6β-dichloro-21-benzoyloxy-17α-hydroxy-pregnane-3,20-dione and 5α,6β-dichloro-21-t-butylacetoxy-17α-hydroxy-pregnane-3,20-dione and treating said steroid starting materials with sodium acetate in ethanol there is obtained after precipitation with water, filtration and drying the corresponding 6-chloro-21-propionyloxy-17α-hydroxy-4-pregnene-3,20-dione, 6-chloro-21-butyryloxy-17α-hydroxy-4-pregnene-3,20-dione, 6-chloro-21-benzoyloxy-17α-hydroxy-4-pregnene-3,20-dione and 6-chloro-21-t-butylacetoxy-17α-hydroxy-4-pregnene-3,20-dione.

EXAMPLE 3

*6β-Chloro-21-Acetoxy-17α-Hydroxy-16α-Methyl-4-Pregnene-3,20-Dione*

A mixture of one gram of 5α,6β-dichloro-21-acetoxy-17α-hydroxy-16α-methyl-pregnane-3,20-dione, 1 gram of anhydrous sodium acetate and 50 ml. of 95% ethanol is maintained at the reflux temperature of the reaction mixture for approximately 30 minutes to produce 6β-chloro-21-acetoxy-17α-hydroxy-16α-4-pregnene-3,20-dione. To the resulting colorless solution containing the product is added approximately 50 ml. of water and the entire reaction mixture is then evaporated under reduced pressure to remove the ethanol, whereupon an aqueous slurry of crystalline product is formed. An additional 50 ml. of water is added and the slurry is cooled and filtered to recover the product. The product is then washed and dried.

In the manner described in the preceding paragraph 5α,6β-dichloro-17α,21-dihydroxy-16α-methyl-pregnane-3,20-dione is treated with potassium acetate in ethanol to produce 6β-chloro-17α,21-dihydroxy-16α-methyl-4-pregnene-3,20-dione which is recovered by precipitation with water, filtered and dried.

EXAMPLE 4

*6β-Chloro-21-Acetoxy-17α-Hydroxy-16β-Methyl-4-Pregnene-3,20-Dione*

A mixture of one gram of 5α,6β-dichloro-21-acetoxy-17α-hydroxy-16β-methyl-pregnane-3,20-dione, 1 gram of anhydrous sodium acetate and 50 ml. of 95% ethanol is maintained at the reflux temperature of the reaction mixture for approximately 30 minutes to produce 6β-chloro-21-acetoxy-17α-hydroxy-16β-methyl-4-pregnene-3,20-dione. To the resulting colorless solution containing the product is added approximately 50 ml. of water and the entire reaction mixture is then evaporated under reduced pressure to remove the ethanol, whereupon an aqueous slurry of crystalline product is formed. An additional 50 ml. of water is added and the slurry is cooled and filtered to recover the product. The product is then washed and dried.

In the manner described in the preceding paragraph 5α,6β-dichloro-17α,21-dihydroxy-16β-methyl-pregnane-3,20-dione is treated with potassium acetate in ethanol to produce 6β-chloro-17α,21-dihydroxy-16β-methyl-4-pregnene-3,20-dione which is recovered by precipitation with water, filtered and dried.

EXAMPLE 5

*Other 21-Esters of 6-Chloro-17α,21-Dihydroxy-16α-Methyl-4-Pregnene-3,20-Dione*

In the manner described in Example 3 and using as the steroid starting material 5α,6β-dichloro-21-propionyloxy-17α-hydroxy-16α-methyl-pregnane-3,20-dione, 5α,6β-dichloro - 21 - butyryloxy-17α-hydroxy-16α-methyl-pregnane - 3,20-dione, 5α,6β-dichloro - 21 - benzoyloxy - 17α-hydroxy-16α-methyl-pregnane-3,20-dione, and 5α,6β-dichloro - 21-t-butylacetoxy-17α-hydroxy-16α-methyl-pregnane-3,20-dione and treating said steroid starting materials with sodium acetate in ethanol there is obtained after precipitation with water, filtration and drying the corresponding 6-chloro - 21 - propionyloxy-17α-hydroxy-16α-methyl - 4 - pregnene-3,20-dione, 6-chloro-21-butyryloxy-17α-hydroxy-16α-methyl-4-pregnene-3,20-dione, 6-chlorobenzoyloxy - 17α - hydroxy-16α-methyl-4-pregnene-3,20-dione and 6 - chloro-21-t-butylacetoxy-17α-hydroxy-16α-methyl-pregnane-3,20-dione.

EXAMPLE 6

*Other 21-Esters of 6-Chloro-17α,21-Dihydroxy-16β-Methyl-4-Pregnene-3,20-Dione*

In the manner described in Example 3 and using as the steroid starting material 5α,6β-dichloro-21-propionyloxy-17α - hydroxy - 16β - methyl-pregnane-3,20-dione, 5α,6β-dichloro - 21 - butyryloxy-17α-hydroxy-16β-methyl-pregnane - 3,20 - dione, 5α,6β-dichloro-21-benzoyloxy-17α-hydroxy - 16β - methyl - pregnane-3,20-dione, and 5α,6β-dichloro - 21-t-butylacetoxy-17α-hydroxy-16β-methyl-pregnane-3,20-dione and treating said steroid starting materials with sodium acetate in ethanol there is obtained after precipitation with water, filtration and drying the corresponding 6-chloro - 21 - propionyloxy-17α-hydroxy-16β-methyl - 4 - pregnene-3,20-dione, 6-chloro-21-butyryloxy-17α-hydroxy-16β-methyl-4-pregnene-3,20-dione, 6-chlorobenzoyloxy - 17α - hydroxy-16β-methyl-4-pregnene-3,20-dione and 6 - chloro-21-t-butylacetoxy-17α-hydroxy-16β-methyl-pregnane-3,20-dione.

The 5,6-dichloro-17α-hydroxy-21acyloxy or hydroxy-16α-methyl-pregnane-3,20-dione compounds which are used as the starting materials for my process are prepared in the following manner: 3-acetoxy-5,16-pregnadien-20-one is contacted with methyl magnesium iodide to form 16α-methyl-3β-hydroxy-5-pregnen-20-one which is then acylated with acetic anhydride in the presence of pyridine to form 3β-acetoxy-16α-methyl-5-pregnen-20-one. The latter compound is then reacted with chlorine in chloroform to form 3-acetoxy-16α-methyl-5,6-dichloro-pregnan-20-one which, in turn, is contacted with dimethyl oxalate under strong alkaline conditions to form the methyl ester of 16α - methyl-5,6-dichloro-3-hydroxy-20-keto-21-pregnaneglyoxylic acid. Upon reacting the latter compound with methanolic sodium hydroxide there is formed 5,6-dichloro - 3 - hydroxy-16α-methyl-20-keto-21-pregnaneglyoxylic acid which, in turn, is contacted with acetic anhydride in the presence of dinitrobenzenesulfonic acid to form 3,23 - diacetoxy-5,6-dichloro-16α-methyl-21-normethyl - 17(20),22 - choladieno - 24(20) - lactone. The formed lactone is then contacted with perbenzoic acid dissolved in benzene to form 3β,23-diacetoxy-5,6-dichloro-16α - methyl - 21-normethyl-17(20)-oxido-22-choladieno-24(20)-lactone which on reaction with sodium hydroxide in tetrahydrofuran forms 5,6-dichloro-3β,17α-dihydroxy-16α - methyl - pregnan-20-one. The latter compound is treated with bromine in chloroform to form 21-bromo-5,6 - dichloro - 3β,17α-dihydroxy-16α-methyl-pregnan-20-one which on treatment with potassium acetate and potassium iodide in acetone and acetic acid is converted to 5,6 - dichloro - 3β,17α-dihydroxy-21-acetoxy-16α-methyl-pregnan-20-one. The later compound is oxidized with chromium trioxide in aqueous acetic acid to form 5,6-dichloro - 17α - hydroxy-21-acetoxy-16α-methyl-pregnane-3,20-dione which may be hydrolyzed to the corresponding 5,6 - dichloro - 17α,21-dihydroxy-16α-methyl-pregnane-3,20-dione by treatment with a mixture of about 1 part of concentrated hydrochloric acid and 4 parts of methanol at about 25° C. for one hour. The latter compound when contacted with the appropriate acid chloride, e.g. propionyl chloride, butyryl chloride, benzoyl chloride and t-butyl acetyl chloride in a dry solvent forms the corresponding 21-ester, e.g. the 21-propionate, 21-butyrate, 21-benzoate, and the 21-t-butylacetate of 5,6-dichloro-17α,21-dihydroxy-16α-methyl-4-pregnene-3,20-dione. These reactions are described in greater detail in application Serial No. 759,116 filed September 5, 1958 of Meyer Sletzinger, Donald Reinhold and Sandor Karady, now U.S. Patent No. 3,068,228.

The 5,6-dichloro-17α-hydroxy-21-acyloxy or hydroxy-16β-methyl-pregnane-3,20-dione compounds used as starting materials in the process of my invention are conveniently prepared in the following manner starting with the known 3 - acetoxy-16-methyl-5,16-pregnadien-20-one: A mixture is prepared of 10 grams of 3-acetoxy-16-methyl-5,16-pregnadien-20-one, 400 cc. of benzene and 4.7 ml. of pyridine. To the solution is added slowly at room temperature one molecular equivalent of chlorine dissolved in carbon tetrachloride. After the reaction is complete the entire reaction mixture is washed with 2% aqueous sodium thiosulfate solution, 5% aqueous hydrochloric acid and water, respectively. The solution is then concentrated under reduced pressure to yield a dry residue of product. The product is recrystallized from acetone. Approximately 10 grams of the latter compound dissolved in 100 ml. of methanol and 10 ml. 10 N sodium hydroxide solution and 10 ml. of 30% aqueous hydrogen peroxide. The reaction mixture is stirred at approximately 25° C. for two hours after which a second 10 ml. portion of 30% aqueous hydrogen peroxide is added. The reaction mixture is then stirred for 22 hours at 25° C. It is diluted with an equal volume of water to precipitate the product, 5,6 - dichloro - 3 - hydroxy - 16,17 - oxide-16-methyl-pregnan-20-one. The precipitated product is recovered by filtration, washed and dried and recrystallized from isopropyl alcohol. Approximately 10 grams of the latter product is dissolved in 300 ml. of dioxane and 150 ml. of 14% aqueous perchloric acid and stirred for approximately 22 hours at 25° C. under an atmosphere of nitrogen. The reaction mixture is poured slowly into 4 liters of water, whereupon the product, a mixture of 5,6-dichloro-3,17α-dihydroxy-15-pregnen - 20 - one and 5,6-dichloro-3,17α-dihydroxy - 16 - methylene-pregnan-20-one precipitates and is recovered by filtration, washed and dried. Approximately one gram of the latter mixture of isomers is hydrogenated in 100 ml. of methanol in the presence of one gram of 10% palladium on carbon at atmospheric pressure until one molar equivalent of hydrogen is absorbed. The catalyst is removed by filtration and the filtrate containing the products of the reaction, a mixture of 5,6 - dichloro - 3,17α - dihydroxy-16α-methyl-pregnan-20-one and 5,6 - dichloro - 3,17α - dihydroxy-16β-methyl-pregnan-20-one, is concentrated to dryness and subjected to chromatography on Florisil in order to recover the desired 16β-methyl compound. Fractions containing the 16β-methyl compound are easily distinguished from fractions containing 16α-methyl isomer since the 16β-methyl compound is the more dextrorotatory. Approximately 10 mm. of the separated 5,6-dichloro-3,17α-dihydroxy-16β-methyl-pregnan-20-one isomer is then dissolved in 120 ml. of warm chloroform to which is added 11 mm. of bromide in chloroform at 45° C. over a period of about one hour. The entire reaction mixture is washed with aqueous 10% sodium bicarbonate solution and water. The washed solution containing the product, 5,6-dichloro - 21 - bromo - 3,17α - dihydroxy - 16β - methyl-pregnan-20-one is then evaporated under reduced pressure to remove the solvent and the product recovered by trituration of the residue with cold methanol. Approximately 3 grams of 5,6-dichloro-21-bromo-3,17α-dihydroxy-16β-methyl-pregnan-20-one is refluxed for 4 hours in a mixture of 100 ml. of acetone, 3.28 grams potassium acetate, 1.0 ml. glacial acetic acid and 1.56 grams sodium iodide to form 5,6-dichloro-3,17α-dihydroxy-21-acetoxy-16β-methyl-pregnan-20-one and 100 ml. of water is added.

Acetone is removed from the reaction mixture by evaporation under reduced pressure and the formed product which precipitates from solution is recovered by filtration and washed with water. The latter product is then oxidized to the corresponding 3-keto compound in the following manner: To a solution of one gram of 5,6-dichloro - 3,17α - dihydroxy - 21 - acetoxy - 16β - methyl-pregnan-20-one in 20 ml. acetic acid and 2 ml. of water at about 5° C. is added a solution of 0.2 gram chromium trioxide dissolved in 0.2 ml. of water and 2.5 ml. of glacial acetic acid, maintaining the temperature at 5° C. To the mixture is then added 0.2 ml. of sulfuric acid and the entire reaction mixture stirred for approximately 30 minutes at 5° C. Following the oxidation the mixture is diluted with 50 ml. of chloroform and 50 ml. of water and shaken to extract the steroid into the chloroform layer. The chloroform layer containing the product is separated, washed with three 50 ml. portions of 2% aqueous sodium bicarbonate and water. The product, 5,6 - dichloro - 17α - hydroxy - 21 - acetoxy - 16β - methyl-pregnane-3,20-dione, is recovered from the dried chloroform solution by evaporation under reduced pressure and trituration of the residue with ether. The latter product is hydrolyzed to the corresponding 5,6-dichloro-17α,21-dihydroxy-16β-methyl-pregnane-3,20-dione by treatment with a mixture of about one part of concentrated hydrochloric acid and 4 parts methanol at about 25° C. for one hour. Other 21-esters of this material are then prepared by reaction of the latter compound with the appropriate acyl chloride in a dry solvent, for example, treatment of 5,6-dichloro-17α,21-dihydroxy-16β-methyl-pregnane - 3,20 - dione with propionyl chloride, butyryl chloride, benzoyl chloride and t-butyl acetyl chloride in pyridine yields the corresponding 21-propionate, 21-butyrate, 21-benzoate and 21-t-butyl acetate.

What is claimed is:
1. The process which comprises contacting a 5,6-dichloro-17α-hydroxy-3,20-diketo steroid of the formula:

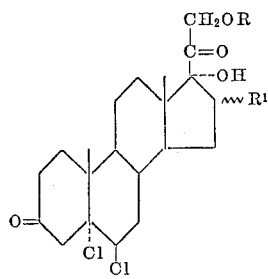

wherein R is a member selected from the group consisting of hydrogen and acyl and R¹ is a member selected from the group consisting of hydrogen and methyl with an alkali metal salt of a lower aliphatic carboxylic acid to produce a compound of the formula:

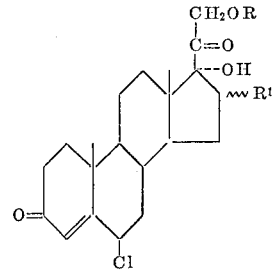

wherein R is a member selected from the group consisting of hydrogen and acyl and R¹ is a member selected from the group consisting of hydrogen and methyl.

2. The process which comprises contacting 5α,6β-dichloro-21-acetoxy-17α-hydroxy-pregnane-3,20-dione with sodium acetate to produce 6β-chloro-21-acetoxy-17α-hydroxy-4-pregnene-3,20-dione.

3. The process which comprises contacting 5α,6β-dichloro-21-acetoxy - 17α - hydroxy - 16α - methyl-pregnene-3,20-dione with sodium acetate to produce 6β-chloro-21-acetoxy-17α-hydroxy-16α-methyl-4-pregnene-3,20 - dione.

4. The process which comprises contacting 5α,6β-dichloro-21-acetoxy - 17α - hydroxy - 16β - methyl-pregnane-3,20-dione with sodium acetate to produce 6β-chloro-21-acetoxy - 17α - hydroxy - 16β - methyl-4-pregnene-3,20-dione.

5. A 6-chloro-17α-hydroxy - 4 - pregnene-3,20-dione compound of the formula:

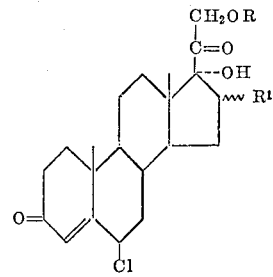

wherein R is a member selected from the group consisting of hydrogen and lower alkanoyl and R¹ is methyl.

6. 6β-chloro-21-acetoxy - 17α - hydroxy - 16α - methyl-4-pregnene-3,20-dione.

7. 6β-chloro-17α,21-dihydroxy - 16α - methyl-4-pregnene-3,20-dione.

References Cited in the file of this patent

UNITED STATES PATENTS

| | | |
|---|---|---|
| 2,777,843 | Chemerda | Jan. 15, 1957 |
| 2,786,855 | Sondheimer et al. | Mar. 26, 1957 |
| 2,786,856 | Cutler et al. | Mar. 26, 1957 |
| 2,881,168 | Spero | Apr. 7, 1959 |
| 2,934,546 | Ringold et al. | Apr. 26, 1960 |
| 3,067,219 | Ringold et al. | Dec. 4, 1962 |

OTHER REFERENCES

Ringold et al.: J. A. C. S., vol. 80, p. 6464 (1958).